US011106758B2

(12) United States Patent
Chan et al.

(10) Patent No.: US 11,106,758 B2
(45) Date of Patent: Aug. 31, 2021

(54) CUSTOMIZED DISPLAY OF FILTERED SOCIAL MEDIA CONTENT USING A PRIVATE DISLIKE BUTTON

(71) Applicant: INTERNATIONAL BUSINESS MACHINES CORPORATION, Armonk, NY (US)

(72) Inventors: Yuk L. Chan, Rochester, NY (US); Michael L. Greenblatt, Jefferson Hills, PA (US); Heidi Lagares-Greenblatt, Jefferson Hills, PA (US); Deepti M. Naphade, Cupertino, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/269,682

(22) Filed: Feb. 7, 2019

(65) Prior Publication Data

US 2020/0257742 A1    Aug. 13, 2020

(51) Int. Cl.
*G06F 3/048* (2013.01)
*G06F 16/958* (2019.01)
(Continued)

(52) U.S. Cl.
CPC .......... *G06F 16/958* (2019.01); *G06F 3/0482* (2013.01); *G06F 3/04847* (2013.01); *G06F 16/9536* (2019.01); *H04L 51/32* (2013.01)

(58) Field of Classification Search
CPC ..... G06Q 50/01; G06F 16/335; G06F 16/958; G06F 3/04847; G06F 16/9536;
(Continued)

(56) References Cited

U.S. PATENT DOCUMENTS

2011/0196865 A1    8/2011  Eggink et al.
2011/0302117 A1*  12/2011  Pinckney ............... G06N 20/00
                                                     706/12
(Continued)

OTHER PUBLICATIONS

Chan, Yuk L. et al., U.S. Appl. No. 16/269,685 entitled "Customized Display of Filtered Social Media Content Using a Private Dislike Button" filed on Feb. 7, 2019.

(Continued)

*Primary Examiner* — Alex Olshannikov
(74) *Attorney, Agent, or Firm* — Cantor Colburn LLP; Teddi Maranzano

(57) ABSTRACT

Methods, systems and computer program products for providing a customized display of social media content are provided. Aspects include receiving a plurality of social media posts that have been published for display by a social media service. Aspects also include receiving a profile associated with a user of the social media service including social media post filtering preferences. The social media post filtering preferences are created based at least in part upon an analysis of social media posts that were previously disliked by the user. Aspects further include identifying a set of acceptable social media posts and a set of unacceptable social media posts. Aspects also include causing the set of acceptable social media posts to be displayed in a news feed window of the social media service in association with an account of the user of the social media service.

13 Claims, 10 Drawing Sheets

(51) Int. Cl.
*G06F 3/0484* (2013.01)
*G06F 16/9536* (2019.01)
*H04L 12/58* (2006.01)
*G06F 3/0482* (2013.01)

(58) Field of Classification Search
CPC .. G06F 3/0482; G06F 3/0481; G06F 16/9535; H04L 67/22; H04L 51/32; H04L 51/10; H04L 51/18; H04L 51/14
See application file for complete search history.

(56) References Cited

U.S. PATENT DOCUMENTS

| | | | | |
|---|---|---|---|---|
| 2012/0166476 A1* | 6/2012 | Zaidi | ................... | G06F 16/907 707/769 |
| 2013/0018957 A1 | 1/2013 | Parnaby et al. | | |
| 2013/0066885 A1* | 3/2013 | Komuves | ............... | G06Q 10/10 707/748 |
| 2014/0101611 A1* | 4/2014 | Lang | ...................... | G06F 21/32 715/813 |
| 2014/0172544 A1 | 6/2014 | Rabkin | | |
| 2014/0365382 A1* | 12/2014 | Rubinstein | ............. | G06Q 10/10 705/309 |
| 2015/0106446 A1* | 4/2015 | Brophy | .................. | H04L 67/12 709/204 |
| 2015/0178371 A1 | 6/2015 | Seth et al. | | |
| 2016/0054871 A1* | 2/2016 | Strike | ................... | G06F 3/0482 715/738 |

OTHER PUBLICATIONS

IBM "List of IBM Patents or Patent Applictions Treated as Related; (Appendix P)", Filed Feb. 7, 2019, 2 pages.
Lafferty, Just "You Want a Dislike Button? Here's Why Facebook Isn't Giving You One", retreived at: http://www.adweek.com/digital/you-want-a-dislike-button-heres-why-facebook-isnt-giving-you-one/; dated Feb. 26, 2016; 3 pgs.

\* cited by examiner

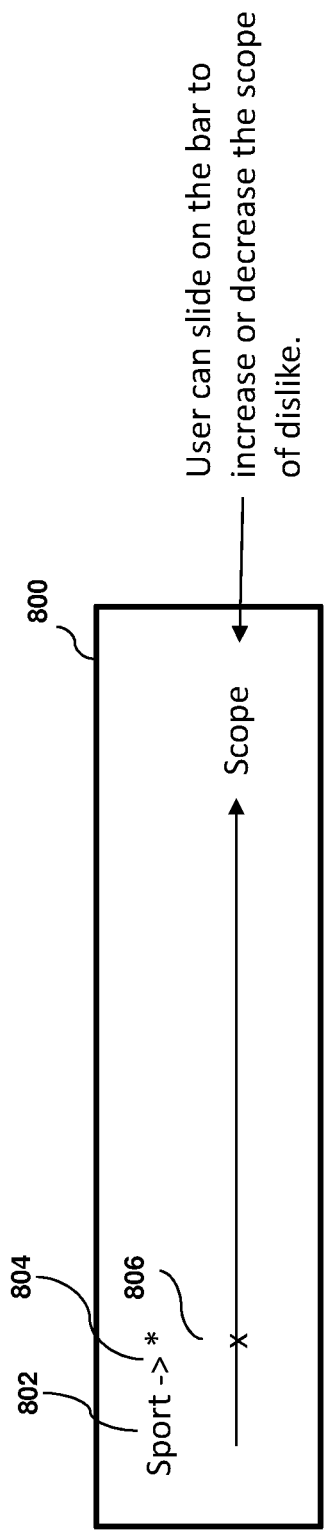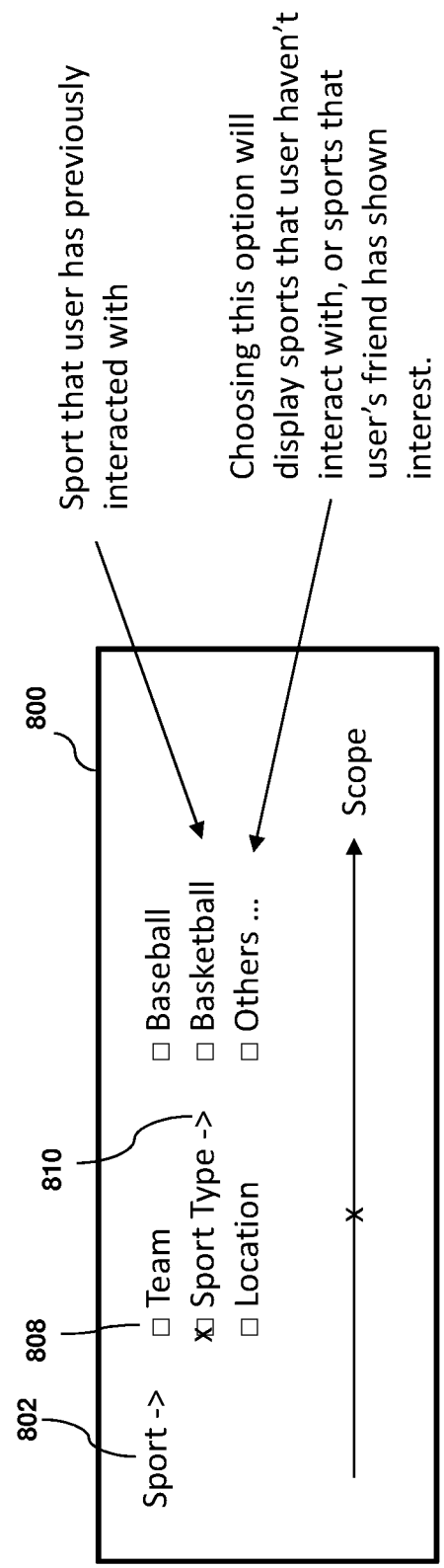

CUSTOMIZED DISPLAY OF FILTERED SOCIAL MEDIA CONTENT USING A PRIVATE DISLIKE BUTTON

BACKGROUND

The present invention generally relates to the presentation of social media content, and more specifically, to providing a customized display of social media content that is automatically filtered based on the use of a private dislike button.

Social media services that allow a user to form social networks with friends, family, colleagues, strangers, organizations, and other contacts commonly provide the contacts with the capability of posting content that is viewable by the user via, for example, a website or a mobile application. Content that is posted by a user's contacts (or in public forums, strangers) may be presented to the user in a chronologically arranged "news feed" of social media posts. Because a user has no control over what content is published by other users; a user may often be subjected to viewing social media content that the user finds upsetting or objectionable. For example, a user may be targeted with cyberbullying, trolling, or other negative attention. In other cases, a user may simply experience a negative reaction to viewing negative posts, such as posts that may result from a highly-public, highly-contested political campaign. To avoid encountering such negative posts, users may resort to avoiding the social media platform for a long time or to blocking or (or "defriending") users who may post negative content, which may, unfortunately, cause the user to otherwise miss out on significant positive content.

SUMMARY

Embodiments of the present invention are directed to a computer-implemented method for providing a customized display of social media content. A non-limiting example of the computer-implemented method includes receiving a plurality of social media posts that have been published for display by a social media service. The method also includes receiving a profile associated with a user of the social media service, the profile having social media post filtering preferences, wherein the social media post filtering preferences are created based at least in part upon an analysis of social media posts that were previously disliked by the user. The method further includes identifying, based on the profile, a set of acceptable social media posts of the plurality of social media posts and a set of unacceptable social media posts of the plurality of social media posts. The method also includes causing the set of acceptable social media posts to be displayed in a news feed window of the social media service in association with an account of the user of the social media service.

Embodiments of the present invention are directed to a system for providing a customized display of social media content that is automatically filtered. The system includes a memory having computer readable computer instructions, and a processor for executing the computer readable instructions. The computer-readable instructions include instructions for receiving a plurality of social media posts that have been published for display by a social media service. The computer-readable instructions also include instructions for receiving a profile associated with a user of the social media service, the profile having social media post filtering preferences, wherein the social media post filtering preferences are created based at least in part upon an analysis of social media posts that were previously disliked by the user. The computer-readable instructions further include instructions for identifying, based on the profile, a set of acceptable social media posts of the plurality of social media posts and a set of unacceptable social media posts of the plurality of social media posts. The computer-readable instructions also include instructions for causing the set of acceptable social media posts to be displayed in a news feed window of the social media service in association with an account of the user of the social media service.

Embodiments of the invention are directed to a computer program product for providing a customized display of social media content, the computer program product comprising a computer readable storage medium having program instructions embodied therewith. The computer-readable storage medium is not a transitory signal per se. The program instructions are executable by a processor to cause the processor to perform a method. A non-limiting example of the method includes receiving a plurality of social media posts that have been published for display by a social media service. The method also includes receiving a profile associated with a user of the social media service, the profile having social media post filtering preferences, wherein the social media post filtering preferences are created based at least in part upon an analysis of social media posts that were previously disliked by the user. The method further includes identifying, based on the profile, a set of acceptable social media posts of the plurality of social media posts and a set of unacceptable social media posts of the plurality of social media posts. The method also includes causing the set of acceptable social media posts to be displayed in a news feed window of the social media service in association with an account of the user of the social media service.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIGS. 8A and 8B depict example user interfaces for creating filtering preferences for a social media service according to one or more embodiments of the invention.

Figure 1:
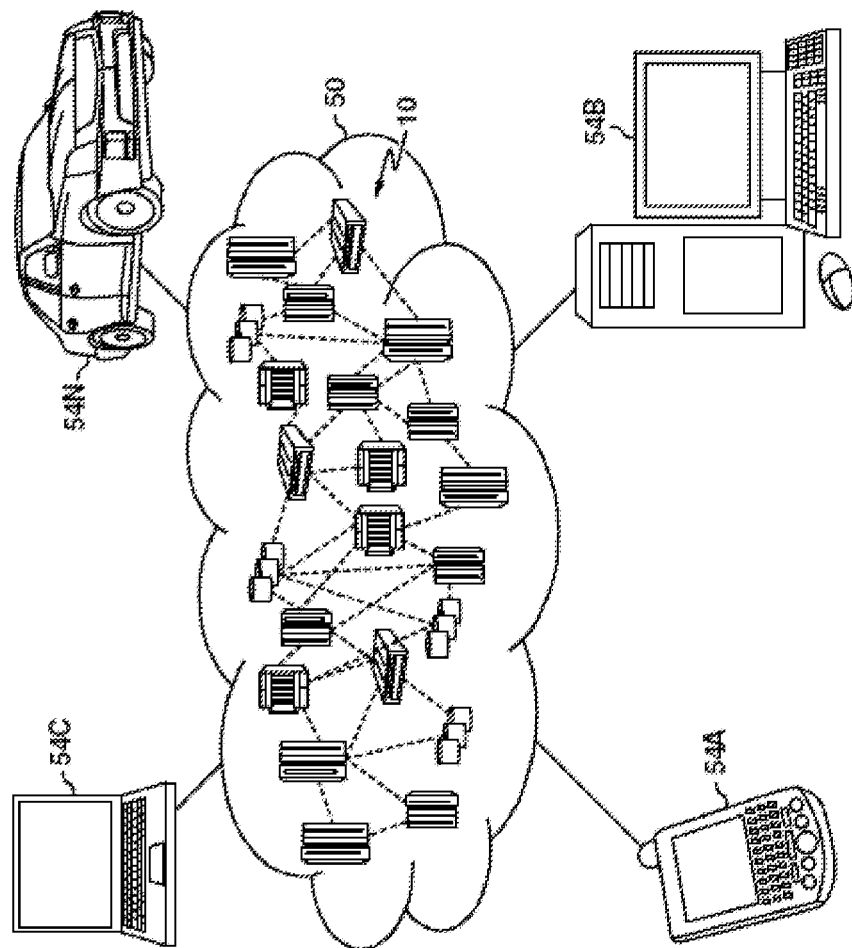
FIG. 1 depicts a cloud computing environment according to one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
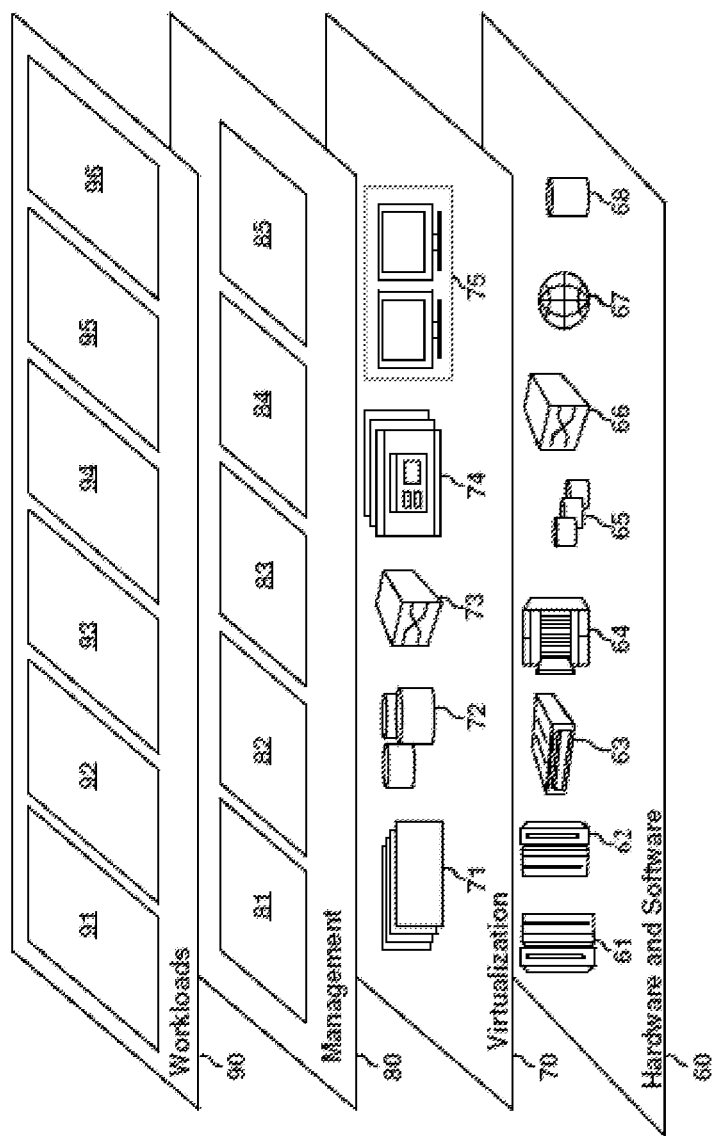
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing a customized display of social media content 96.

Figure 3:
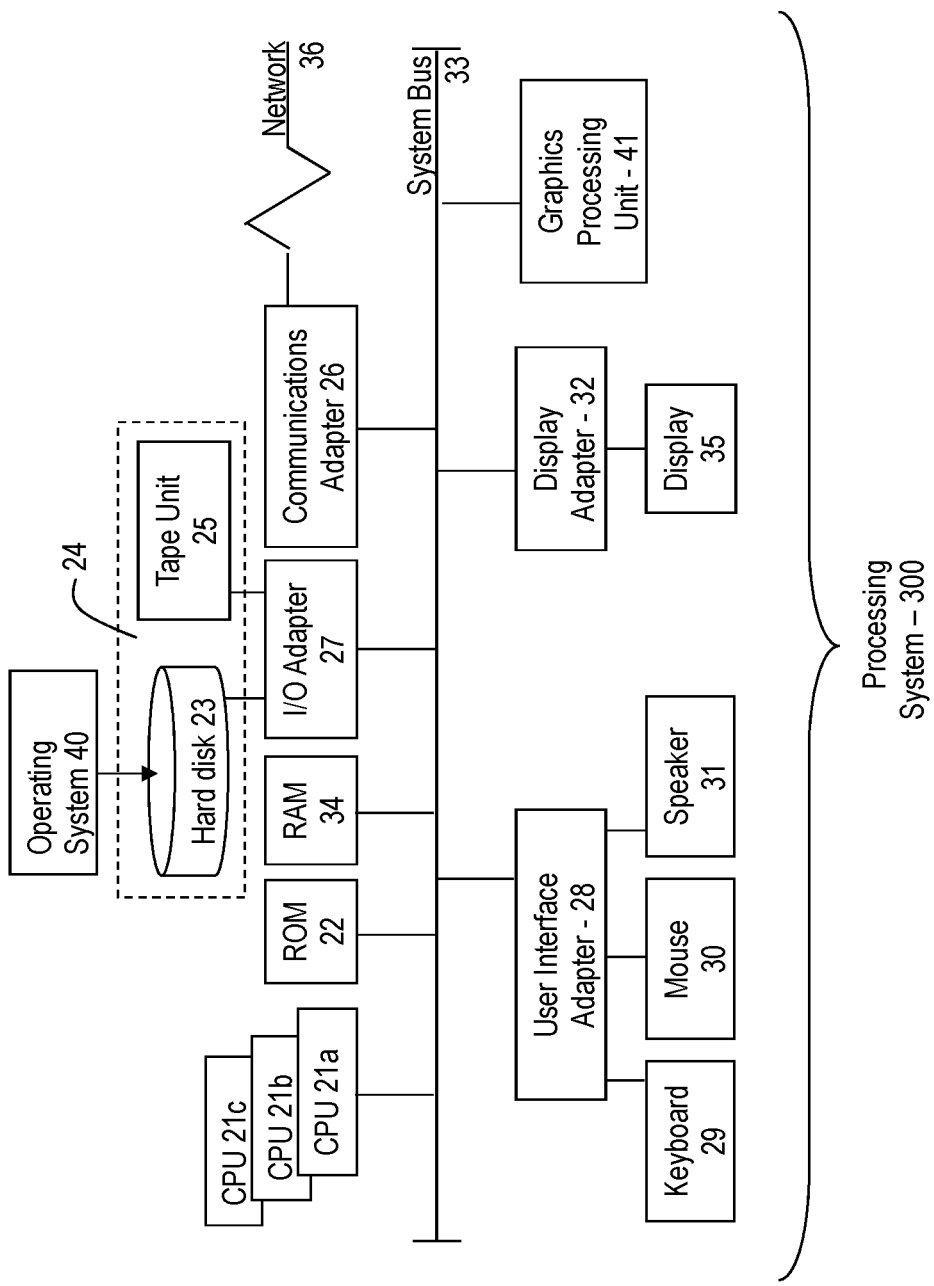
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

In exemplary embodiments, a system for providing a customized display of social media content is provided. In exemplary embodiments, the system may perform content analysis on a plurality of social media posts to identify acceptable and unacceptable social media posts based on filtering preferences associated with a user. In some embodiments, the system may filter out the unacceptable social media posts such that only the acceptable social media posts are displayed to the user in, for example, the user's primary social media news feed or on a public comment forum. In exemplary embodiments, the filtering preferences of the user are created through the use of a private dislike button. In one embodiment, upon encountering a post which the user dislikes, the user selects the dislike button. Once the dislike button is selected, the social network service analyzes the post and identifies one or more topics in the post, these topics are then presented to the user. The user selects at least one of the topics that cause the user to dislike the post and the selected topics are then added to the filtering preferences for the user. According to some embodiments, a user may customize a display to either hide some or all unacceptable social media posts or display one or more secondary news feeds that correspond to one or more categories filtered content.

In exemplary embodiments, a system for modifying viewing permissions of a social media post using a private dislike button is provided. In exemplary embodiments, the system notifies a user of a social media service that the user is referenced in a social media post. Based on a determination that the user dislikes the social media post, the system modifies a viewing permission of the social media post to prevent the social media post from being displayed in a news feed of one or more friends of the user. In exemplary embodiments, the system is used to allow a user to control the content that friends of the user see that relate to the user. For example, if a first user posts a picture of themselves with a second user and the second user dislikes the picture, the picture will not be displayed in the news feed of friends of the second user that are not friends of the first user. However, the picture will still be displayed in the news feed of individuals that are friends of the first user.

Figure 4:
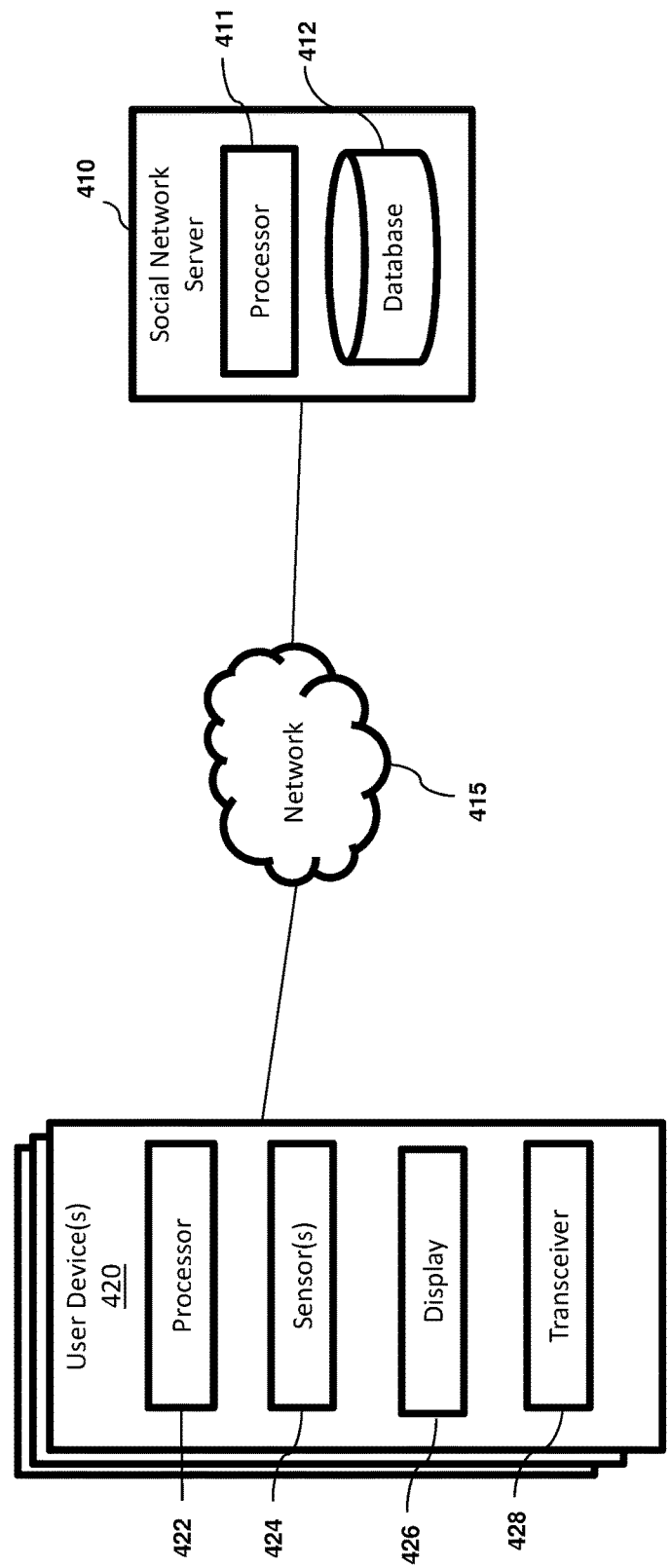
FIG. 4 depicts a system upon which providing a customized display of social media content that is automatically filtered may be implemented according to one or more embodiments of the present invention.

Turning now to FIG. 4, a system 400 for providing a customized display of social media content will now be described in accordance with an embodiment. The system 400 includes a social network server 410 in communication with user devices 420 via communications network 415. The communications network 415 may be one or more of, or a combination of, public (e.g., Internet), private (e.g., local area network, wide area network, virtual private network), and may include wireless and wireline transmission systems (e.g., satellite, cellular network, terrestrial networks, etc.). The user devices 420 are configured to allow a user to input, upload, and view social media posts and content through, for example, a website, a mobile application, or the like.

In exemplary embodiments, user devices 420 can include, but are not limited to, a smartphone, a wearable device such as a smartwatch, an augmented reality headset, a tablet, a computer system such as the one shown in FIG. 3, a television, or any other suitable electronic device. The user device 420 includes a processor 422, one or more sensors 424, a display 426 and a transceiver 428. The sensors 424 can include one or more of an image capture device (e.g., digital camera) for obtaining images and/or videos, a microphone for obtaining audio recordings, and a location sensor for obtaining location data of the user device (e.g., GPS coordinates). User devices 420 can include an input device, such as a keyboard (either physical or digital) for receiving user input text. Text can also be input orally via a microphone using voice recognition. Display 426 is configured to display social media content, such as a news feed or website forum of one or more social media posts and/or comments. In some embodiments, display 426 can be a touchscreen that may be configured to detect tactile user inputs (e.g., typing, pressing, swiping, etc.). Transceiver 428 can be configured to allow a user device 420 to communicate with other devices via communications network 415 (e.g., via Wi-Fi, cellular communications, etc.).

In some embodiments, a social network server 410 can include a processor 411 and a database 412 or another storage element. The social network server 410 can store various social media data such as usernames, passwords, relationships between users, social media content submitted by users, and user account preferences such as filtering preferences associated with user accounts. According to some embodiments, the social networking server 410 can include software that is configured to analyze and/or characterize the content of social media posts using natural language processing. For example, in some embodiments, the social network server 410 may include an analysis module for determining one or more topics associated with a social media post. The analysis module may be provided by IBM® WATSON® Alchemy Language application program interface (API) or WATSON® Natural Language Understanding API. The above mentioned APIs are mentioned for exemplary purposes. Any applicable cognitive AI can be utilized within the analysis module. The analysis module can process natural language to incorporate both a linguistic and statistical analysis in evaluating the context of a communication.

As described further below, social network server 410 can be configured to classify social media posts based on the subject matter content of the social media post and can customize the display of social media posts based on such classifications in view of the filtering preferences of the user. In some embodiments, in addition to natural language processing, the social network server 410 may be configured to determine a content of an image or video associated with a social media post using image recognition techniques.

Figure 5:
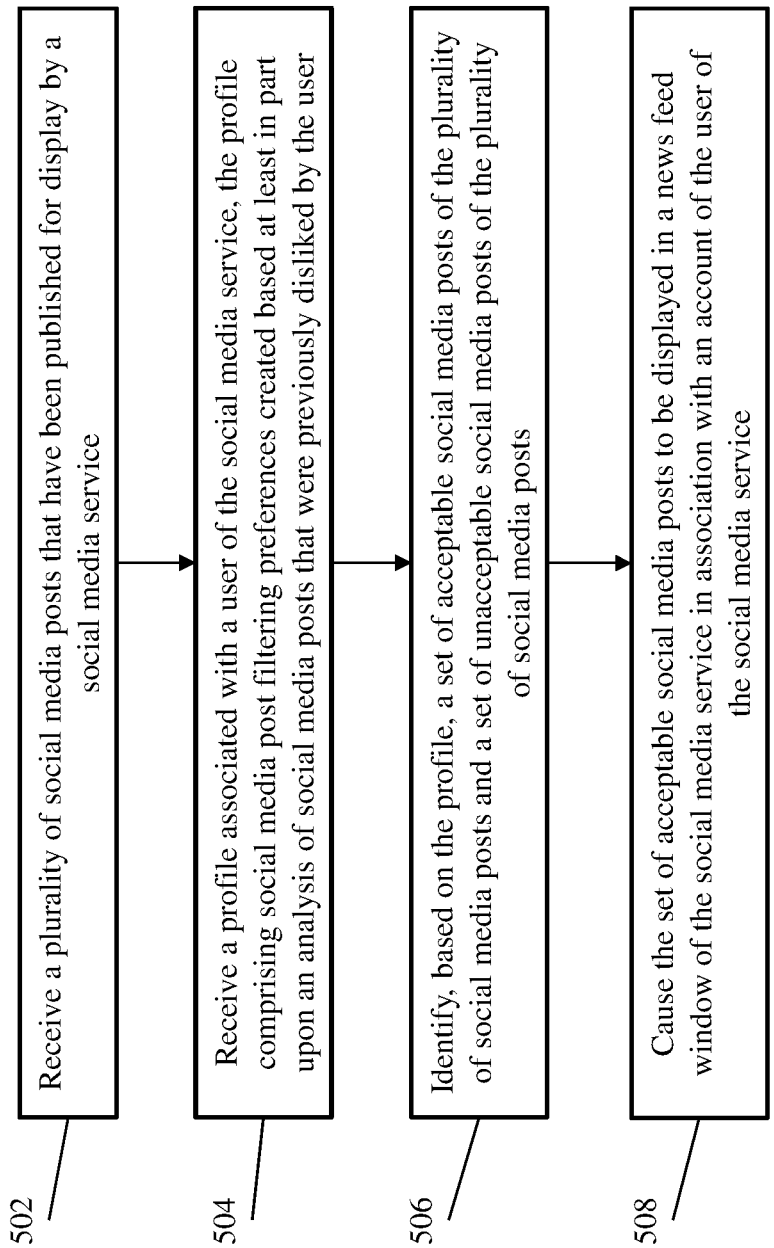
FIG. 5 depicts a flow diagram of a method for providing a customized display of social media content according to one or more embodiments of the invention.

Turning now to FIG. 5, a flow diagram of a method 500 for providing a customized display of social media content in accordance with an embodiment is shown. In one or more embodiments of the present invention, the method 500 may be embodied in software that is executed by computer elements located within a network that may reside in the cloud, such as the cloud computing environment 50 described hereinabove and illustrated in FIGS. 1 and 2. In other embodiments, the computer elements may reside on a computer system or processing system, such as the processing system 300 described hereinabove and illustrated in FIG. 3, or in some other type of computing or processing environment.

Figure 6A:
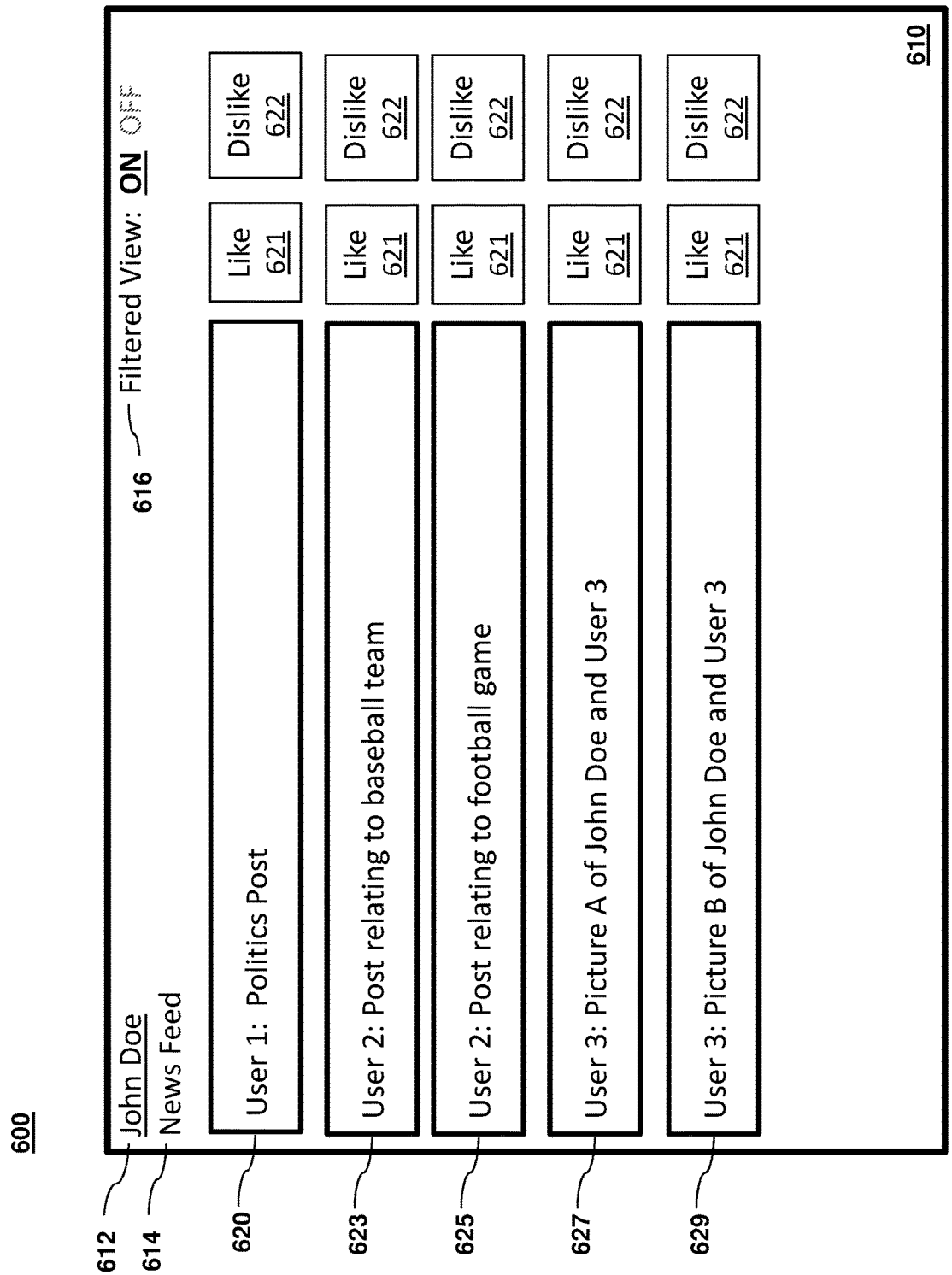
FIGS. 6A and 6B depict example social media post display windows of a system of providing a customized display of social media content according to one or more embodiments of the invention.

The method 500 begins at block 502 and includes receiving (e.g., by social network server 410) a plurality of social media posts that have been published for display by a social media service. According to some embodiments, a social media post can include text, one or more images, videos and/or links to websites. A social media post may also refer to a comment made by a user on another social media post. FIG. 6A shows an example of a social media posts display window 600 that includes a primary news feed window 610 for displaying one or more social media posts. A social media post display window can be configured to be displayed by a display 426 of a user device 420, such as a computer screen, a TV, a smartphone display, or the like. In some embodiments, a primary news feed window 610 can be configured to display a sequence of social media posts for example, in order of when the social media post was uploaded or published for viewing. As will be understood by those of skill in the art, the contents of a news feed 614 may be unique to the user account 612 associated with the primary news feed window 610, based on, for example, the contacts or friends associated with the user account 612 that are creating the social media content. For example, a primary news feed window 610 may be configured to only display social media content generated by friends or connections of the user account 612. While this description is generally directed to a news feed window, it should be understood that it may also be applicable to social media posts made on a public forum, such as for example, open comments made on an online news article that can be viewed or commented upon by anyone.

As shown in FIG. 6A, the news feed window may be configured to display social media posts 620, 623, 625, 627 and 629 from a plurality of users. A like icon 621 and a dislike icon 622 are displayed next to each of the social media posts 620, 623, 625, 627 and 629. The like icon 621 and a dislike icon 622 are configured to receive feedback from the user on whether the user likes or dislikes the content of the social media posts 620, 623, and 625. In one embodiment, the user selection of the dislike icon 622 is kept private by the social media site and is not shared with any other user of the social media site. In one embodiment, the news feed window 610 includes a filter selection icon 616 that allows the user to selectively turn on/off the filtering of the news feed based on their filtering preferences.

As shown at block 504, the method 500 includes receiving a profile associated with a user of the social media service, the profile including social media post filtering preferences. In one embodiment the filtering preferences are created based at least in part upon an analysis of social media posts that were previously disliked by the user. In some embodiments, social media post filtering preferences can include one or more topics that have been identified as disliked by the user. In one example, a particular user may like sports in general but may not like baseball and therefore the social media filtering preferences of that user may include baseball as a disliked topic. In another example, a user may not like sports at all and therefore the social media filtering prefer-ences of that user may include all sports as disliked topics. In another example, a user may only like sports-related content for a specific set of teams and therefore the social media filtering preferences of that user may indicate that posts relating to sports that are not related to specific teams are disliked. In exemplary embodiments, the social media post filtering preferences created based at least in part upon an analysis of social media posts that were previously disliked by the user. For example, when a user dislikes a post an analysis of the post is performed and a list of topics is presented to the user for selection. The user's selection of the topics is then used to create and/or update the social media post filtering preferences. For example, if a user clicks dislike for a post associated with a baseball game, the user can be presented with the topics of sports, baseball, team 1, and team 2 for selection.

Next, as shown at block 506, the method identifying, based on the profile, a set of acceptable social media posts of the plurality of social media posts and a set of unacceptable social media posts of the plurality of social media posts. According to some embodiments, performing an analysis on each of the plurality of social media posts to determine one or more topics that are related to each post. These identified topics are then compared to the filtering preferences and the posts are categorized as acceptable/unacceptable for the user. In the example shown in FIGS. 6A and 6B, the system can determine that for example, the first social media posts 620 and 625 relates to acceptable topics, e.g., politics and football, respectively, and the social media post 623 relates to an unacceptable topic, e.g., baseball. Based on the filtering preferences of the user, the system (e.g., social network server 410) determines that social media posts 620 and 625 make up a set of acceptable social media posts and conversely social media posts 623 is an unacceptable social media posts for the user.

Figure 6B:
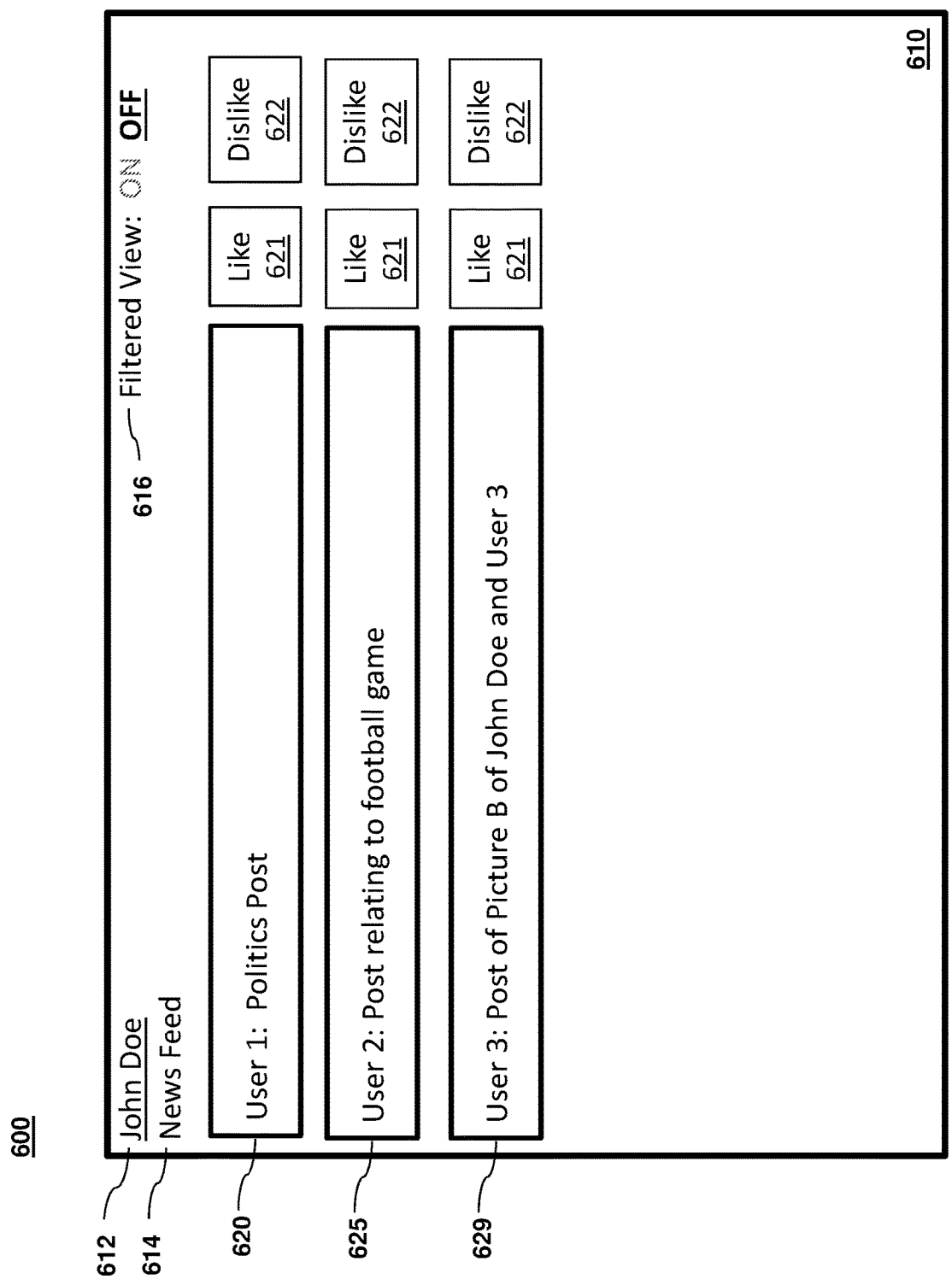

As shown in block 508, the method 500 includes causing the set of acceptable social media posts to be displayed in a news feed window of the social media service in association with an account of the user of the social media service. In some embodiments, the method can include causing the set of unacceptable social media posts to be prevented from being displayed in the primary news feed window of the social media service in association with an account of the user of the social media service. For example, as shown in FIG. 6B, the system may automatically remove the social media posts 623 from display in the primary news feed window 610, such that only social media posts 620 and 625 are displayed in the primary news feed window 610. In this way, the system 400 can automatically configure the social media content that is displayed to the user in accordance with the user's profile. In exemplary embodiments, the user can toggle the filtering of the content of the posts using the filtering icon 616. In another embodiment, the user interface may include an option to display a log of filtered posts. In some embodiments, the method includes causing the set of unacceptable posts to be displayed in a secondary news window of the social media service in association with the account of the user of the social media service.

Figure 7:
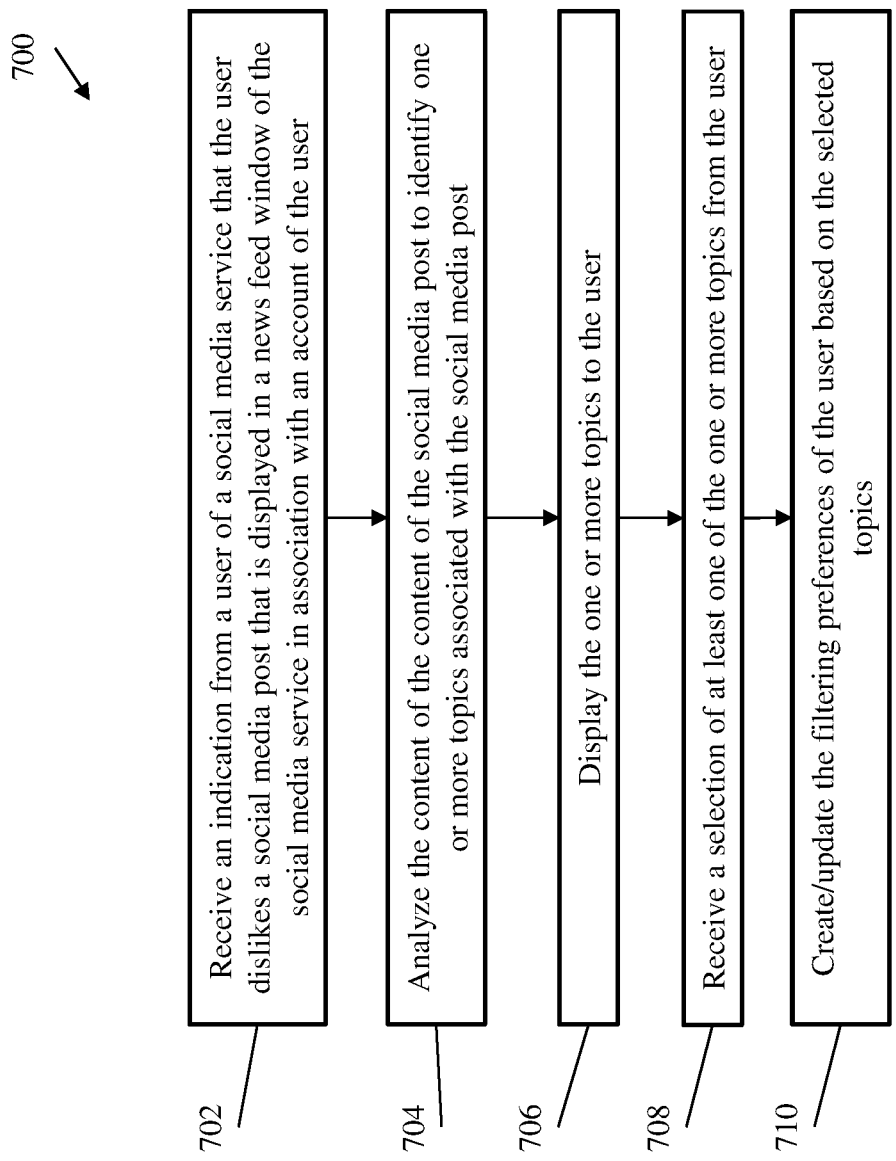
FIG. 7 depicts a flow diagram of a method for creating filtering preferences for a social media service using a private dislike button according to one or more embodiments of the invention.

Turning now to FIG. 7, a flow diagram of a method 700 for creating filtering preferences for a social media service using a private dislike button in accordance with an embodiment is shown. In one or more embodiments of the present invention, the method 700 may be embodied in software that is executed by computer elements located within a network that may reside in the cloud, such as the cloud computing environment 50 described hereinabove and illustrated in FIGS. 1 and 2. In other embodiments, the computer elements may reside on a computer system or processing system, such as the processing system 300 described hereinabove and illustrated in FIG. 3, or in some other type of computing or processing environment.

As shown in block 702, the method 700 includes receiving an indication from a user of a social media service that the user dislikes a social media post that is displayed in a news feed window of the social media service in association with an account of the user. In an exemplary embodiment, the indication includes the user selecting a dislike button associated with the social media post displayed in the news feed. Next, as shown at block 704, the method 700 includes analyzing the content of the content of the social media post to identify one or more topics associated with the social media post. In exemplary embodiments, natural language processing and/or image processing techniques can be used to identify the one or more topics associated with the social media post. The method 700 also includes displaying the one or more topics to the user, as shown at block 706. As shown in block 708, the method 700 includes receiving a selection of at least one of the one or more topics from the user. The method 700 further includes creating and/or updating the filtering preferences of the user based on the selected topics, as shown at block 710.

In exemplary embodiments, the content of posts that are liked, or commented on, by a user can also be analyzed and the topics that are identified as being associated with these posts can be added to the filtering preferences as topics that the user wishes to see. In one example, if a post includes both topics that the user has expressed interest in and topics that the user has previously disliked, the post can be included in the set of acceptable posts and displayed in the filtered view to the user.

Referring now to FIGS. 8A and 8B, an example user interface 800 for creating filtering preferences for a social media service according to one or more embodiments of the invention are shown. In exemplary embodiments, when the user chooses to dislike an item in the social network, the user interface 800 is displayed to the user. The user interface 800 is configured to allow the user to define the scope of their dislike of the post. The user interface 800 includes one or more topics 802 that are identified based on an analysis of the post and includes a slide bar 806 that allows the user to quantify the scope of their dislike of the selected topic and to provide a magnitude of their dislike of the selected topic. In exemplary embodiments, the user interface 800 includes a topic expansion icon 804 that allows a user to customize their filtering preferences by providing additional information regarding their dislike of the topic 802.

In exemplary embodiments, upon a section of the topic expansion icon 804 a configuration panel is displayed that provides configurable items 808 based a taxonomy. The taxonomy can be generated based on user's interaction with the social network, and/or the interaction of one or more friends of the user with the social network. The configurable items 808 can be explicit items that user can select from or allows the user to drill down 810. The configurable items can include the "like" or "dislike" items. The configurable items can be pre-selected for "like" or "dislike" based on user's history. For example, if the user chooses to decrease the scope, a more granular list of options can be displayed. If the user has shown interest for a specific sports type, these sports types can be explicitly listed as an option and pre-selected for "like". In another example, if the user has shown dislike for a specific sports team, the teams can be explicitly listed and pre-selected for "dislike". Furthermore, the taxonomy can also partially base on pre-defined knowledge such as "location", "type", known sport.

In an exemplary embodiment, based on the dislike preference, a list of posts to be hidden from the user is available. Instead of removing all these posts, a small subset of these posts can be displayed to the user on the news feed window. This allows the collection of feedback on the filtered post from the user, while minimizing the disliked post. Furthermore, the small subset can be chosen to cover a variety of topics. These topics can be identified using the taxonomy mentioned above. The topics can also be selected based on the confidence level of specific topic being disliked by a user. For example, the user has shown interest in baseball, but the user has chosen to dislike sport in general. The system could reduce the social network items related to sports, and rotationally show different sports frequent and periodically. Furthermore, the system can show baseball more than the other sport because of prior indication of interest.

Figure 9:
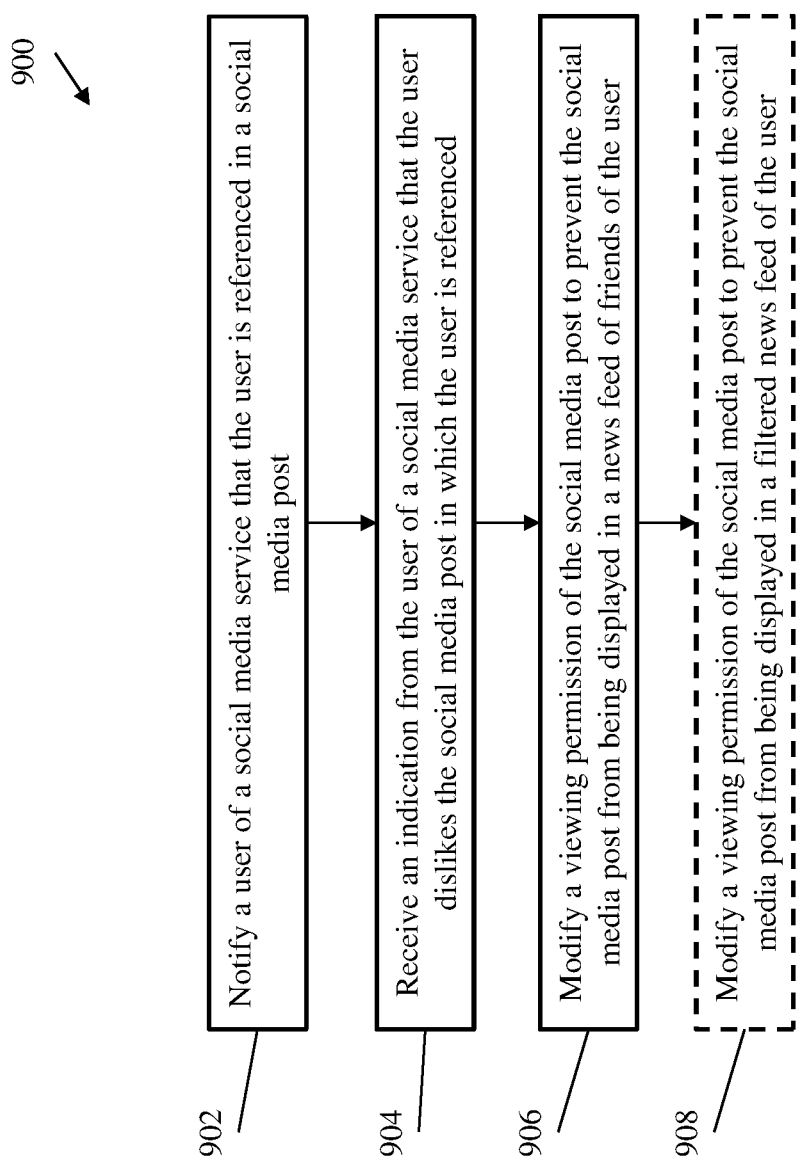
FIG. 9 depicts a flow diagram of a method for modifying viewing permissions of a social media post using a private dislike button according to one or more embodiments of the invention.

Turning now to FIG. 9, a flow diagram of a method 900 for modifying viewing permissions of a social media post using a private dislike button in accordance with an embodiment is shown. In one or more embodiments of the present invention, the method 900 may be embodied in software that is executed by computer elements located within a network that may reside in the cloud, such as the cloud computing environment 50 described hereinabove and illustrated in FIGS. 1 and 2. In other embodiments, the computer elements may reside on a computer system or processing system, such as the processing system 300 described hereinabove and illustrated in FIG. 3, or in some other type of computing or processing environment.

As shown in block 902, the method 900 includes notifying a user of a social media service that the user is referenced in a social media post. In one embodiment, the determination that the user is referenced in the social media post is based at least upon the user being tagged in the social media post. In another embodiment, the social media post includes a picture and the determination that the user is referenced in the social media post is based at least upon a determination that the picture includes an image of the user. Next, as shown at block 904, the method 900 includes receiving an indication from the user that the user dislikes the social media post in which the user is referenced. In exemplary embodiments, a like button and a dislike button are displayed next to each social media post displayed in the news feed window of the social media service and the indication that the user dislikes the social media post is generated by the user clicking on the dislike button associated with the social media post.

Next, as shown at block 906, the method 900 includes modifying a viewing permission of the social media post to prevent the social media post from being displayed in a news feed of one or more friends of the user. In exemplary embodiments, the one or more friends of the user include friends of the user that are not also friends of an individual that posted the social media post. For example, if a first user posts a picture of themselves with a second user and the second user dislikes the picture, the picture will not be displayed in the news feed of friends of the second user that are not friends of the first user. However, the picture will still be displayed in the news feed of individuals that are friends of the first user. In exemplary embodiments, the method 900 can also include modifying a viewing permission of the social media post to prevent the social media post from being displayed in a filtered news feed of the user. Continuing with the above example, this would prevent the picture from being displayed in the news feed of the second user.

Additional processes may also be included. It should be understood that the processes depicted in FIGS. 5, 7, and 9 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving a plurality of social media posts that have been published for display by a social media service;
receiving a profile associated with a user of the social media service, the profile comprising social media post filtering preferences, wherein the social media post filtering preferences are created based at least in part upon an analysis of social media posts that were previously disliked by the user;
identifying, based on the profile, a set of acceptable social media posts of the plurality of social media posts and a set of unacceptable social media posts of the plurality of social media posts;
causing the set of acceptable social media posts to be displayed in a news feed window of the social media service in association with an account of the user of the social media service;
causing the set of unacceptable social media posts to be displayed in a secondary news window of the social media service in association with the account of the user of the social media service;
updating the social media post filtering preferences by:
analyzing a content of a post displayed in a news feed window and presenting one or more topics to the user for selection; and
receiving a selection of the one or more topics from the user along with an indication of a magnitude of a dislike of the one or more topics;
identifying a published post on the social media service that includes a reference to the user;
receiving, from the user, an indication that that user dislikes the published post; and
modifying, by the social media service, a viewing permission of the published post based on the indication that that user dislikes the published post, wherein modifying the viewing permission of the published post prevents the post from being displayed to friends of the user and allows the post to be displayed in news feeds of individuals that are not friends of the user.

2. The computer-implemented method of claim 1, further comprising displaying a like button and a dislike button next to each social media post displayed in the news feed window of the social media service.

3. The computer-implemented method of claim 2, wherein updating the social media post filtering preferences is further based at least in part on the user selecting one of the like button and the dislike button associated with a first post.

4. The computer-implemented method of claim 2, wherein the dislike button is a private dislike button that does not share that the user disliked a post with other users of the social media service.

5. The computer-implemented method of claim 1, wherein the set of acceptable social media posts of the plurality of social media posts is identified by extracting one or more topics in each of the social media posts and determining that the one or more topics are not indicated as being disliked in the social media post filtering preferences of the user.

6. A system comprising:
a processor communicatively coupled to a memory, the processor configured to:
receive a plurality of social media posts that have been published for display by a social media service;
receive a profile associated with a user of the social media service, the profile comprising social media post filtering preferences, wherein the social media post filtering preferences are created based at least in part upon an analysis of social media posts that were previously disliked by the user;
identify, based on the profile, a set of acceptable social media posts of the plurality of social media posts and a set of unacceptable social media posts of the plurality of social media posts;
cause the set of acceptable social media posts to be displayed in a news feed window of the social media service in association with an account of the user of the social media service;
cause the set of unacceptable social media posts to be displayed in a secondary news window of the social media service in association with the account of the user of the social media service; and
update the social media post filtering preferences by:
analyze a content of a post displayed in a news feed window and presenting one or more topics to the user for selection; and
receive a selection of the one or more topics from the user along with an indication of a magnitude of a dislike of the one or more topics;
identify a published post on the social media service that includes a reference to the user;
receive, from the user, an indication that that user dislikes the published post; and
modify, by the social media service, a viewing permission of the published post based on the indication that that user dislikes the published post, wherein modifying the viewing permission of the published post prevents the post from being displayed to friends of the user and allows the post to be displayed in news feeds of individuals that are not friends of the user.

7. The system of claim 6, wherein the processor is further configured to display a like button and a dislike button next to each social media post displayed in the news feed window of the social media service.

8. The system of claim 7, wherein updating the social media post filtering preferences is further based at least in part on the user selecting one of the like button and the dislike button associated with a first post.

9. The system of claim 7, wherein the dislike button is a private dislike button that does not share that the user disliked a post with other users of the social media service.

10. The system of claim 7, wherein the set of acceptable social media posts of the plurality of social media posts is identified by extracting one or more topics in each of the social media posts and determining that the one or more topics are not indicated as being disliked in the social media post filtering preferences of the user.

11. A computer program product comprising a computer readable storage medium having program instructions embodied therewith the program instructions executable by a computer processor to cause the computer processor to perform a method comprising:
  receiving a plurality of social media posts that have been published for display by a social media service;
  receiving a profile associated with a user of the social media service, the profile comprising social media post filtering preferences, wherein the social media post filtering preferences are created based at least in part upon an analysis of social media posts that were previously disliked by the user;
  identifying, based on the profile, a set of acceptable social media posts of the plurality of social media posts and a set of unacceptable social media posts of the plurality of social media posts;
  causing the set of acceptable social media posts to be displayed in a news feed window of the social media service in association with an account of the user of the social media service
  causing the set of unacceptable social media posts to be displayed in a secondary news window of the social media service in association with the account of the user of the social media service; and
  updating the social media post filtering preferences by:
    analyzing a content of a post displayed in a news feed window and presenting one or more topics to the user for selection; and
    receiving a selection of the one or more topics from the user along with an indication of a magnitude of a dislike of the one or more topics;
  identifying a published post on the social media service that includes a reference to the user;
  receiving, from the user, an indication that that user dislikes the published post; and
  modifying, by the social media service, a viewing permission of the published post based on the indication that that user dislikes the published post, wherein modifying the viewing permission of the published post prevents the post from being displayed to friends of the user and allows the post to be displayed in news feeds of individuals that are not friends of the user.

12. The computer program product of claim 11, wherein the method further comprises displaying a like button and a dislike button next to each social media post displayed in the news feed window of the social media service.

13. The computer program product of claim 12, wherein updating the social media post filtering preferences is further based at least in part on the user selecting one of the like button and the dislike button associated with a first post.

* * * * *